United States Patent
Liu et al.

(10) Patent No.: US 7,585,484 B2
(45) Date of Patent: Sep. 8, 2009

(54) APPARATUS AND METHOD FOR SYNTHESIZING CARBON NANOTUBES

(75) Inventors: Ka Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 550 days.

(21) Appl. No.: 11/448,567

(22) Filed: Jun. 7, 2006

(65) Prior Publication Data

US 2007/0110660 A1      May 17, 2007

(30) Foreign Application Priority Data

Sep. 15, 2005    (CN) .......................... 2005 1 0037326

(51) Int. Cl.
*D01F 9/12* (2006.01)
(52) U.S. Cl. ................. 423/447.3; 423/447.1; 977/743; 977/843
(58) Field of Classification Search ............... 423/447.1, 423/447.2, 447.3, 445 B; 977/742, 743, 977/842, 843
See application file for complete search history.

(56) References Cited

FOREIGN PATENT DOCUMENTS

TW          00460975        10/2001

OTHER PUBLICATIONS

Cassell, et al., Large Scale CVD Synthesis of Single-Walled Carbon Nanotubes, J. Phys. Chem. B. 1999; 103: 6484-6492.*
Li, et al., Effect of gas pressure on the growth and structure of carbon nanotubes by chemical vapor deposition, Appl. Phys. A 2001; 73: 259-264.*
B. Q. Wei et al, Organized assembly of carbon nanotubes, Nature, Apr. 2, 2002, 495-496, vol. 416.
S. S. Fan et al, Self-oriented regular arrays of carbon nanotubes and their field emission properties, Science, Jan. 22, 1999, 512-514, vol. 283.
Z. F. Ren et al, Synthesis of large arrays of well-aligned carbon nanotubes on glass, Science, Nov. 6, 1998, 1105-1107, vol. 282.

* cited by examiner

*Primary Examiner*—Stuart L. Hendrickson
*Assistant Examiner*—Daniel C. McCracken
(74) *Attorney, Agent, or Firm*—D. Austin Bonderer

(57) ABSTRACT

An exemplary apparatus facilitates the formation of carbon nanotubes with desired tip structures. The apparatus includes a reaction chamber including a gas outlet, and an evacuation device. The reaction chamber is configured for receiving a catalyst from which the carbon nanotubes grow and providing an environment for growing the carbon nanotubes. The evacuation device includes an intake connected with the gas outlet. The evacuation device is configured for reducing an inner pressure in the reaction chamber and inducing the formation of carbon nanotubes with desired tip structures. Methods for synthesizing carbon nanotubes with desired tip structures are also provided.

15 Claims, 4 Drawing Sheets

Introducing a carbon source gas flowing over a catalyst received in a reaction chamber — 1001

Continuously reducing an inner pressure in the reaction chamber with a predetermined pressure-reduction speed — 1002

Forming carbon nanotubes with desired tip structures on the catalyst, the tip structures being related to the pressure-reduction speed — 1003

APPARATUS AND METHOD FOR SYNTHESIZING CARBON NANOTUBES

TECHNICAL FIELD

This invention relates generally to apparatuses and methods for synthesizing tubular nano-structures, and more particularly to an apparatus and a method for synthesizing carbon nanotubes.

BACKGROUND

Carbon nanotubes were first discovered and reported in an article by Sumio Iijima entitled "Helical Microtubules of Graphitic Carbon" (Nature, Vol. 354, Nov. 7, 1991, pp. 56-58). Carbon nanotubes have been highlighted as a new functional material expected to have many microscopic and macroscopic applications. Extensive research has been conducted into using carbon nanotubes in various applications, e.g., in field emission devices, memory devices, gas sensors, microwave shields, electrode pole plates in electrochemical storage units, etc.

There are various kinds of methods for synthesizing carbon nanotubes, for example, arc-discharge methods, laser ablation methods and chemical vapor deposition methods. The chemical vapor deposition methods are widely used for making carbon nanotubes as they are relatively simple, inexpensive, easily mass-produced, and conducive to growing carbon nanotubes with a high level of alignment. Generally, the chemical vapor deposition methods include thermal chemical vapor deposition methods and plasma enhanced chemical vapor deposition methods. An apparatus for synthesizing carbon nanotubes using such a chemical vapor deposition usually includes a reaction chamber having a gas inlet for introducing gas and an opposite gas outlet for discharging exhausted gas. The reaction chamber is configured for receiving a catalyst therein and then providing a growth atmosphere for carbon nanotubes.

Currently, carbon nanotubes synthesized by the above-described methods usually are a mixture of carbon nanotubes having various different kinds of tip structures, includes, for example, closed tip structure and open tip structure. In particular, closed tip structures of carbon nanotubes have no dangling bond and may be hemispherical, cone-shaped or horn-shaped. Open tip structures of carbon nanotubes, on the other hand, may have many dangling bonds. According to research carbon nanotubes having different tip structures may exhibit different chemical and physical properties (e.g. field emission properties, doping, etc). To realize the practical applications of carbon nanotubes, it is necessary to obtain carbon nanotubes with desired tip structures.

What is needed is to provide an apparatus and method for effectively synthesizing carbon nanotubes with desired tip structures.

SUMMARY

A preferred embodiment provides an apparatus for synthesizing carbon nanotubes with desired tip structures. The apparatus includes: a reaction chamber including a gas outlet, and an evacuation device. The reaction chamber is configured for receiving a catalyst from which the carbon nanotubes grow and providing an environment for growing the carbon nanotubes. The evacuation device includes an intake connected with the gas outlet. The evacuation device is configured for continuously reducing an inner pressure in the reaction chamber with a predetermined pressure-reduction speed thereby inducing the formation of carbon nanotubes with desired tip structures.

In another preferred embodiment, a method for synthesizing carbon nanotubes includes the following steps of: introducing a carbon source gas flowing over a catalyst received in a reaction chamber; continuously reducing an inner pressure in the reaction chamber with a predetermined pressure-reduction speed; and forming carbon nanotubes with desired tip structures on the catalyst, the tip structures being related to the pressure-reduction speed.

An apparatus and a method in accordance with preferred embodiments can obtain carbon nanotubes with desired tip structures by way of continuously reducing an inner pressure in the reaction chamber around the catalyst with a predetermined pressure-reduction speed. That is, a pressure of the carbon source gas is reduced when the inner pressure in the reaction chamber around the catalyst is continuously reduced. Amount of carbon dissolved into the catalyst per unit time is accordingly reduced. The reduction of the amount of carbon results in the formation of the carbon nanotubes with desired tip structures.

Other advantages and novel features will become more apparent from the following detailed description of embodiments when taken in conjunction with the accompanying drawings.

BRIEF DESCRIPTION OF THE DRAWINGS

Many aspects of the present apparatus and method for synthesizing carbon nanotubes can be better understood with reference to the following drawings. The components in the drawings are not necessarily drawn to scale, the emphasis instead being placed upon clearly illustrating the principles of the present apparatus and method. Moreover, in the drawings, like reference numerals designate corresponding parts throughout the several views.

The exemplifications set out herein illustrate at least one preferred embodiment, in one form, and such exemplifications are not to be construed as limiting the scope of the present apparatus and method for synthesizing carbon nanotubes in any manner.

DETAILED DESCRIPTION OF PREFERRED EMBODIMENTS

Figure 1:
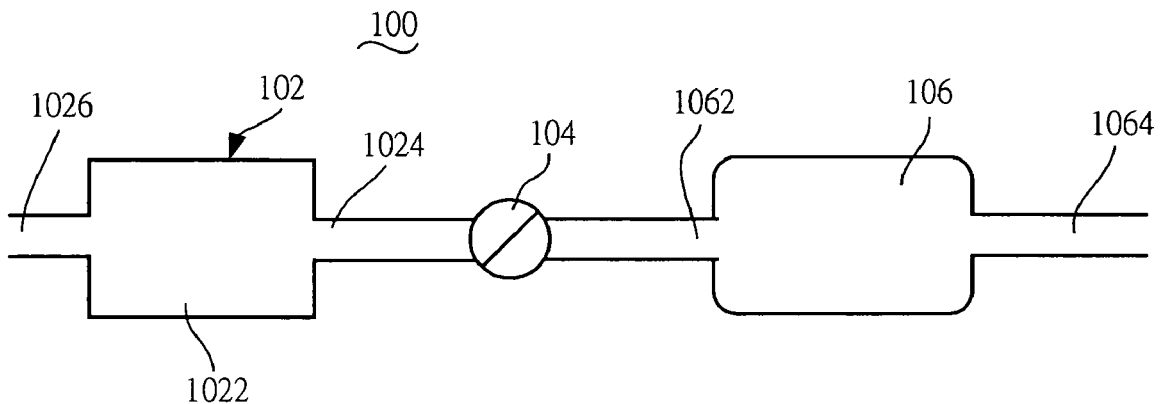
FIG. 1 is a schematic, cross-sectional view of an apparatus for synthesizing carbon nanotubes in accordance with a preferred embodiment.

Referring to FIG. 1, a nanotube-growth apparatus 100 for synthesizing carbon nanotubes is shown. The apparatus 100 generally includes a reactor 102, and an evacuation device 106. Preferably, the apparatus 100 further includes a flow control valve 104.

The reactor 102 includes a reaction chamber 1022 and may be a chemical vapor deposition (CVD) apparatus equipped with a reaction chamber. The reaction chamber 1022 is configured for receiving a catalyst from which carbon nanotubes grow and providing a proper environment (e.g. temperature, pressure, etc) for growing the carbon nanotubes. The reaction chamber 1022 includes a gas outlet 1024, and can be a tube furnace made from quartz or another ceramic. The reaction chamber 1022 also has a gas inlet 1026 opposite to the gas outlet 1024 and for introducing gas therein.

The evacuation device 106 includes an intake 1062 and an exhaust port 1064. The intake 1062 is in communication with the gas outlet 1024 of the reaction chamber 1022. The evacuation device 106 is configured for reducing an inner pressure in the reaction chamber 1022 around the catalyst thereby inducing the formation of carbon nanotubes with desired tip structures. In the illustrated embodiment, the evacuation device 106 is a mechanical pump which usually is a vacuum and/or gas pump utilizing variations of rotating fans or turbine blades to push gas from its intake to its exhaust port. The mechanical pump can reduce the inner pressure of the reaction chamber 1022 to a base pressure of around $1\times10^{-2}$~$10^{-3}$ Torr.

In the preferred embodiment, the flow control valve 104 is connected between the gas outlet 1024 and the intake 1062, and configured for finely setting and/or adjusting a pressure-reduction speed of the evacuation device 106. In the illustrated embodiment, the flow control valve 104 is a needle valve.

Figure 2:
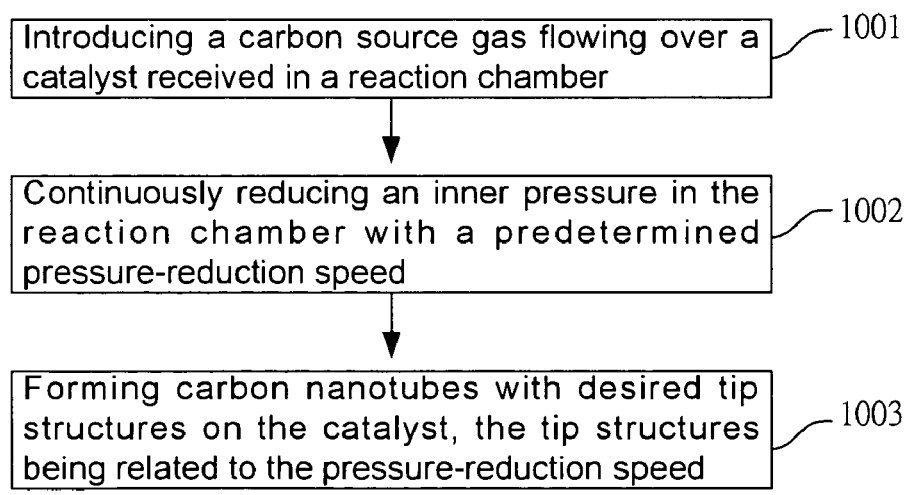
FIG. 2 is a flow chart of method for synthesizing carbon nanotubes in the apparatus of FIG. 1.

A method for synthesizing carbon nanotubes with desired tip structures using such an apparatus 100 will be described below in detail with reference to FIG. 2. The method includes the following steps:

step 1001: introducing a carbon source gas flowing over a catalyst received in a reaction chamber;

step 1002: continuously reducing an inner pressure in the reaction chamber with a predetermined pressure-reduction speed; and step 1003: forming carbon nanotubes with desired tip structures on the catalyst, the tip structures being related to the pressure-reduction speed.

In step 1001, a catalyst (not shown) is received into the reaction chamber 1022 of the reactor 102 (see FIG. 1) and a carbon source gas is introduced over the catalyst. The carbon source gas is decomposed into carbon atoms and hydrogen gas in a catalytic reaction process (e.g. chemical vapor deposition process) with the catalyst. Accordingly, lots of original carbon nanotubes (i.e., carbon nanotubes which are not part of resultant tip structures) originating from the catalyst can be formed during the catalytic reaction process. In particular, the catalyst is generally formed via a deposition process, on a surface of a support substrate. Typically, the catalyst is a thin film, which has a nano-sized (i.e. less than 1 micrometer) thickness. The catalyst thin film can be formed of a transition metal material such as iron (Fe), cobalt (Co), nickel (Ni), or an alloy thereof The carbon source gas usually is introduced into the reaction chamber 1022 together with a carrier gas. A flow ratio of the carbon source gas to the carrier gas usually is in the range from 1:1 to 1:10. Thereby, a flow rate of the carbon source gas can be in the range from 20 to 60 sccm (standard cubic centimeters per minute), and a flow rate of the carrier gas can be in the range from 200 to 500 sccm. The carbon source gas can be a carbon-containing gas, includes, for example, acetylene ($C_2H_2$), ethylene ($C_2H_4$), methane ($CH_4$), and carbon monoxide (CO). The carrier gas can be hydrogen gas and/or an inert gas (e.g. argon or nitrogen). In the illustrated embodiment, the carbon source gas is acetylene, and the carrier gas is argon gas. The flow rate of the carrier gas is about 300 sccm, and the flow rate of the carbon source gas is about 30 sccm.

During the catalytic reaction process, the catalyst is heated up to and maintained at a predetermined temperature, particularly a synthesis temperature of carbon nanotubes. Generally, the synthesis temperature of carbon nanotubes in this embodiment is in the range from 650 to 1200° C. An initial inner pressure in the reaction chamber 1022 around the catalyst is retained at a value which usually is in the range about 0.5~1 atm (atmosphere, 1 atm is approximately equal to 760 Torr). In the illustrated embodiment, the temperature is 950° C., and the initial inner pressure is retained at about 1 atm.

In step 1002, after the original carbon nanotubes have grown up to a suitable length (usually after about 5~30 minutes), the initial inner pressure in the reaction chamber 1022 around the catalyst is continuously reduced via the evacuation device 106 with a predetermined pressure-reduction speed. Several examples of the pressure-reduction speed will be described below in detail. The pressure-reduction speed can be preset in the evacuation device 106, and also can be finely set and/or adjusted via the flow control valve 104.

In step 1003, the original carbon nanotubes can obtain desired tip structures as related to the predetermined pressure-reduction speed, as when the initial inner pressure in the reaction chamber 1022 is continuously reduced a partial pressure of the carbon source gas introduced in the reaction chamber 1022 is reduced at the same rate. Amount of carbon dissolved into the catalyst per unit time is reduced accordingly, the reduction of the amount of carbon can result in the formation of the desired tip structures of the carbon nanotubes. Hereafter, the carbon nanotubes with desired tip structures are referred to as resultant carbon nanotubes.

A relationship between the formation of the desired tip structures and the predetermined pressure-reduction speed in the reaction chamber 1022 around the catalyst will be described below in detail with reference to FIGS. 2-8.

EXAMPLE ONE

Figure 3:
FIG. 3 shows a transmission electron microscopy (TEM) image of a first type of tip structure of resultant carbon nanotubes formed by the method of FIG. 2 with a pressure-reduction speed of 0.8 atmospheres per minute (atm/min)
Figure 4:
FIG. 4 shows a TEM image of the first type of tip structure of resultant carbon nanotubes of FIG. 3 at a different level of magnification.

In the first example, the pressure-reduction speed is set and retained at a relatively low level, for example, about 0.8 atm/min. That is, the initial inner pressure in the reaction chamber 1022 is continuously reduced at a rate of 0.8 atm/min. Consequently, a partial pressure of the carbon source gas introduced in the reaction chamber 1022 is continuously reduced with the same rate of 0.8 atm/min correspondingly, and then the resultant carbon nanotubes can achieve a first type of tip structure. Transmission electron microscopy (TEM) images of the first type of tip structure at different levels of magnification are shown in FIGS. 3 and 4. As shown in FIGS. 3 and 4, a tip structure of each of the resultant carbon nanotubes is closed, zigzag and has a variation in diameter through the tip. The scale bar in FIG. 3 is 50 nanometers, and the scale bar in FIG. 4 is 100 nanometers.

EXAMPLE TWO

Figure 5:
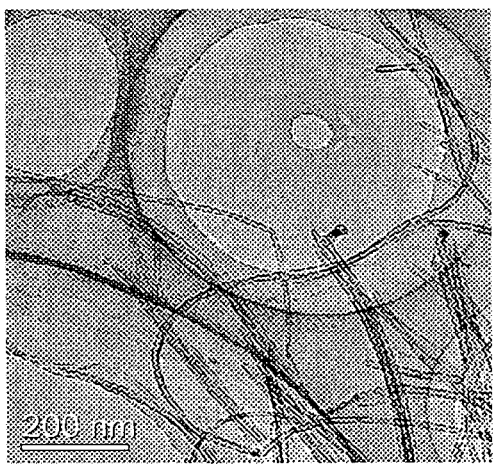
FIG. 5 shows a TEM image of a second type of tip structure of resultant carbon nanotubes formed by the method of FIG. 2 with a pressure-reduction speed of 1.6 atm/min.
Figure 6:
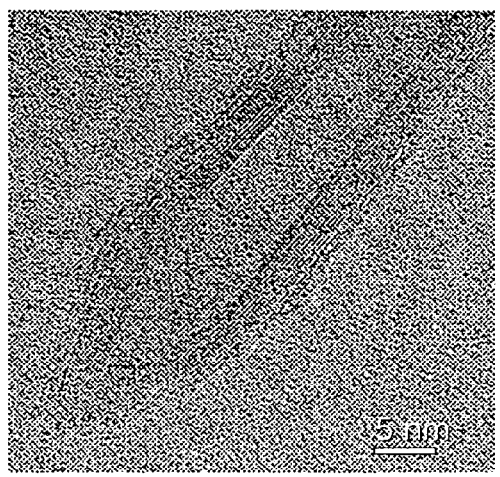
FIGS. 6 and 7 show TEM images of the second type of tip structure of resultant carbon nanotubes of FIG. 5 at a different level of magnification.
Figure 7:
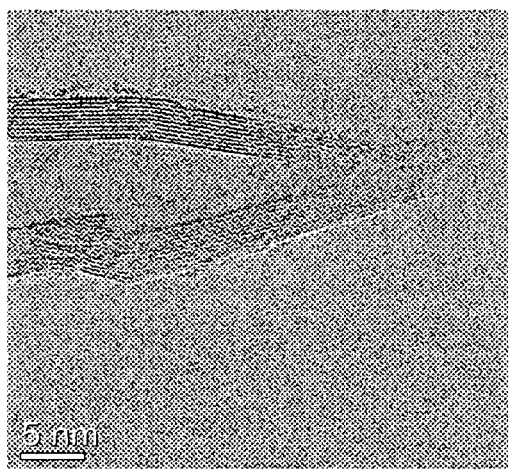

In the second example, the pressure-reduction speed is set and retained at a middling level, for example, about 1.6 atm/ min. That is, the initial inner pressure in the reaction chamber 1022 is continuously reduced at a rate of 1.6 atm/min. Consequently, a partial pressure of the carbon source gas introduced in the reaction chamber 1022 is continuously reduced with the same rate of 1.6 atm/min, and then the resultant carbon nanotubes can achieve a second type of tip structure. TEM images of the second type of tip structure at different level of magnification are shown in FIGS. 5, 6 and 7. As shown in FIGS. 5-7, a tip structure of each of the resultant carbon nanotubes is closed and cone-shaped. The scale bar in FIG. 5 is 200 nanometers, and the scale bars in FIGS. 6 and 7 both are 5 nanometers.

EXAMPLE THREE

Figure 8:
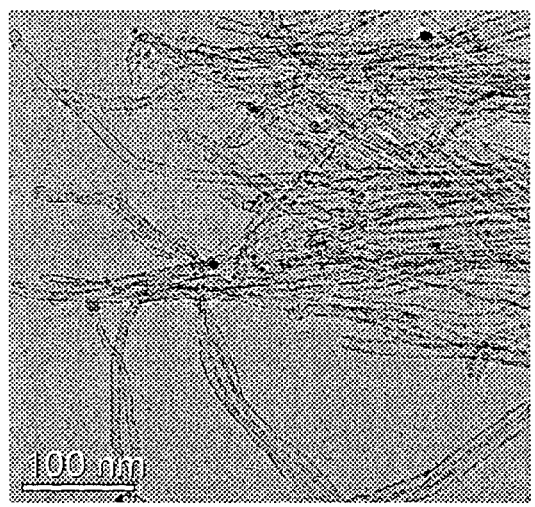
FIG. 8 shows a TEM image of a third type of tip structure of resultant carbon nanotubes formed by the method of FIG. 2 with a pressure-reduction speed of 4.8 atm/min.
Figure 9:
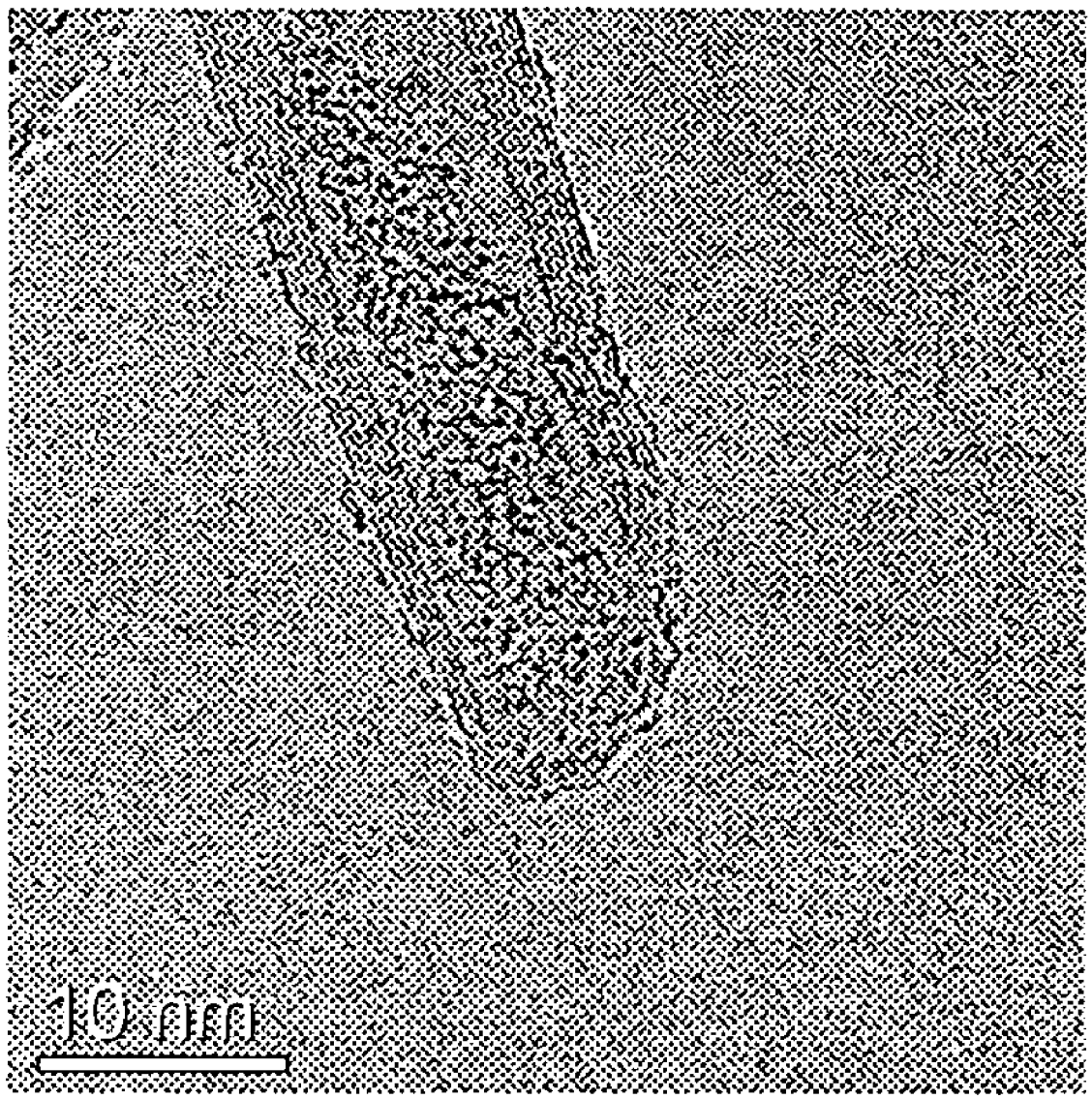
FIG. 9 shows a TEM image of the third type of tip structure of resultant carbon nanotubes of FIG. 8 at a different level of magnification.

In the third example, the pressure reduction speed is set and retained at a relatively high level, for example, about 4.8 atm/min. That is, the initial inner pressure in the reaction chamber 1022 is continuously reduced at a rate of 4.8 atm/min. Consequently, a partial pressure of the carbon source gas introduced in the reaction chamber 1022 is continuously reduced with the same rate of 4.8 atm/min, and then the resultant carbon nanotubes can achieve a third type of tip structure. TEM images of the third type of tip structure at different level of magnification are shown in FIGS. 8 and 9. As shown in FIGS. 8 and 9, a tip structure of each of the resultant carbon nanotubes is open. The scale bar in FIG. 8 is 100 nanometers, and the scale bar in FIG. 9 is 10 nanometers.

In summary, resultant carbon nanotubes can achieve various kinds of desired tip structures by continuously reducing the inner pressure in the reaction chamber 1022 around the catalyst with different predetermined pressure-reduction speeds. As shown in above described examples, when the pressure-reduction speed of the inner pressure in the reaction chamber 1022 is relatively low, e.g. 0.8 atm/min, the resultant carbon nanotubes can achieve closed and zigzag tip structures, and each of the tip structures has a variation in diameter through the tip. When the pressure-reduction speed is middling, e.g., 1.6 atm/min, the resultant carbon nanotubes can achieve closed and cone-shaped tip structures. When the pressure reduction speed is relatively high, e.g., 4.8 atm/min, the resultant carbon nanotubes can achieve open tip structures. It is understood that the resultant carbon nanotubes can achieve even more kinds of desired tip structures by way of setting various kinds of predetermined pressure-reduction speeds.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A method for synthesizing carbon nanotubes with desired tip structures, comprising the steps of:
   introducing a carbon source gas flowing over a catalyst received in a reaction chamber;
   continuously reducing an inner pressure in the reaction chamber with a predetermined pressure-reduction speed; and
   forming carbon nanotubes with desired tip structures on the catalyst, the tip structures being related to the pressure-reduction speed.

2. The method of claim 1, wherein an initial inner pressure in the reaction chamber is in the range from 0.5 to 1 atmosphere.

3. The method of claim 1, wherein the pressure-reduction speed is about 0.8 atmospheres per minute, and each of the tip structures is closed, zigzag and has a varying diameter through the tip.

4. The method of claim 1, wherein the pressure-reduction speed is about 1.6 atmospheres per minute, and each of the tip structures is closed and cone-shaped.

5. The method of claim 1, wherein the pressure-reduction speed is about 4.8 atmospheres per minute, and each of the tip structure is open.

6. The method of claim 1, wherein the carbon source gas is introduced together with a carrier gas.

7. The method of claim 6, wherein a flow ratio of the carbon source gas to the carrier gas is in the range from 1:1 to 1:10.

8. The method of claim 6, wherein the carrier gas is selected from the group consisting of hydrogen gas and inert gas.

9. The method of claim 1, wherein the carbon source gas is selected from the group consisting of acetylene, ethylene, methane and carbon monoxide.

10. The method of claim 1, wherein the reducing step begins after 5~30 minutes from when the carbon nanotubes begin to grow.

11. A method for forming a desired tip structure of a nanotube, comprising the steps of:
    introducing a gaseous raw material flowing over a catalyst on which the nanotube is formed;
    continuously reducing a pressure of the gaseous raw material around the catalyst with a predetermined pressure-reduction speed; and
    inducing the formation of the desired tip structure of the nanotube, the tip structure being related to the pressure-reduction speed.

12. The method of claim 11, wherein an initial pressure of the gaseous raw material around the catalyst is in the range from 0.5 to 1 atmosphere.

13. The method of claim 11, wherein the pressure-reduction speed is about 0.8 atmospheres per minute, and the tip structure is closed, zigzag and has a varying diameter through the tip.

14. The method of claim 11, wherein the pressure-reduction speed is about 1.6 atmospheres per minute, and the tip structure is closed and cone-shaped.

15. The method of claim 11, wherein the pressure-reduction speed is about 4.8 atmospheres per minute, and the tip structure is open.

* * * * *

UNITED STATES PATENT AND TRADEMARK OFFICE
CERTIFICATE OF CORRECTION

PATENT NO. : 7,585,484 B2  Page 1 of 1
APPLICATION NO. : 11/448567
DATED : September 8, 2009
INVENTOR(S) : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 643 days.

Signed and Sealed this

Fourteenth Day of September, 2010

David J. Kappos
*Director of the United States Patent and Trademark Office*